Jan. 9, 1940.   F. BACCARINI   2,186,855
CULINARY UTENSIL
Filed Oct. 25, 1937
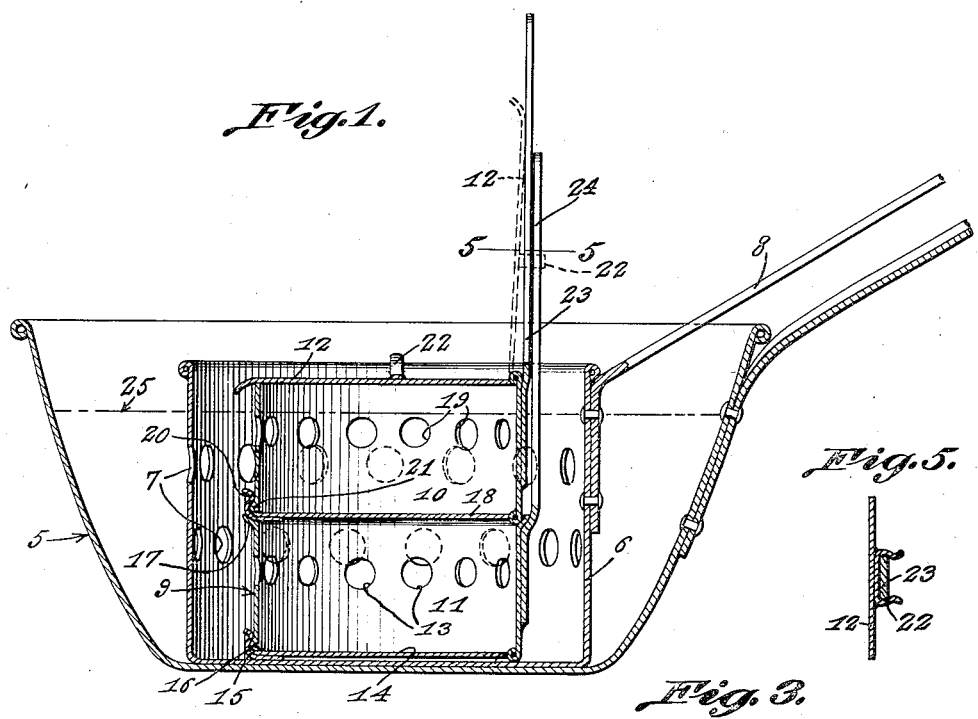
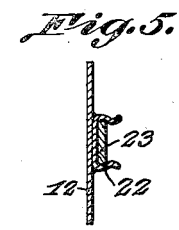
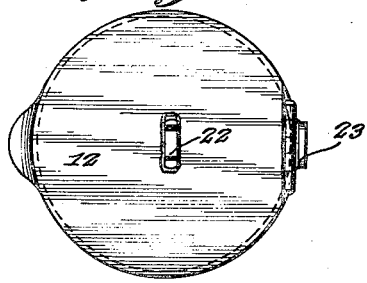
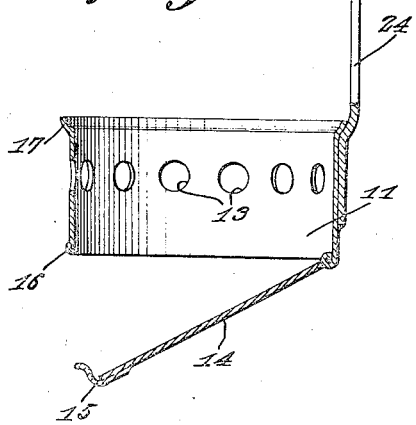
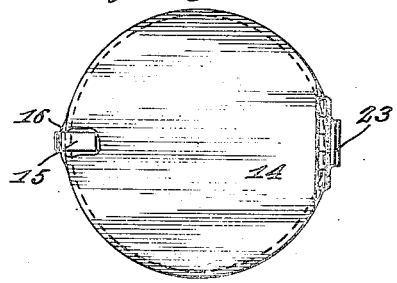
Frank Baccarini, INVENTOR
BY Victor J. Evans & Co.
ATTORNEYS Patented Jan. 9, 1940

2,186,855

UNITED STATES PATENT OFFICE 2,186,855

CULINARY UTENSIL

Frank Baccarini, Pittsburgh, Pa.

Application October 25, 1937, Serial No. 170,951

2 Claims. (Cl. 53—1)

My invention relates to culinary utensils and more particularly to devices for cooking or poaching eggs.

One of the principal objects of my invention is to provide a culinary utensil wherein eggs may be readily poached and removed therefrom in a manner to prevent damage to or breakage of the yokes and/or whites.

Another object of my invention is to provide a device of the above described character which is capable of being used in connection with ordinary cooking vessels without modifying the same.

A further object of my invention is to provide a device of the above described character which is simple in use, durable in construction and economical in manufacture.

Other objects and advantages will be apparent from the following description, appended claims and annexed drawing.

Referring to the drawing wherein like reference characters designate like parts throughout the several views.

Fig. 1 is a vertical section of my invention illustrating the same positioned within the cooking vessel.

Fig. 2 is a detail vertical section illustrating the lower unit of the food container.

Fig. 3 is a top plan view of the upper unit of the food container.

Fig. 4 is a bottom plan view of the lower unit of the food container.

Fig. 5 is a detail sectional view taken on the plane of the line 5—5 of Figure 1.

In teaching my invention an ordinary cooking vessel 5, for instance a stew pan, has inserted therein a receptacle 6 formed with side ports 7 and a handle 8, said receptacle being of a substantially cylindrical configuration and supported on the bottom of the vessel 5. The top of said receptacle is open and is subjacent to the top of the vessel 5.

Within the receptacle 6 I provide a food container 9 having upper and lower units 10 and 11 and said container is supported on the bottom of the receptacle and is provided with a hinged cover 12 on the upper unit subjacent the top of the receptacle.

The lower unit 11 is of a substantially cylindrical configuration and formed with inlet ports 13 on the side thereof. Said unit is open at the upper end thereof and formed with a hinged bottom 14 having a latch member 15 coacting with an offset portion 16 formed adjacent the lower end of said unit for maintaining the bottom in locked or closed position. The upper end of the unit 11 is formed with an outwardly flared section 17 forming a seat for the hinged bottom 18 of the upper unit.

The upper unit is of a similar construction as the bottom unit and is likewise formed with inlet ports 19 in the side thereof and the bottom 18 provided with a latch member 20 coacting with an offset portion 21 adjacent the lower edge of said unit for maintaining said bottom in locked or closed position. The top 12 is hinged to the upper end of the upper unit and is formed with a clip 22 adapted to engage a handle 23 secured to the side of the upper unit, as clearly illustrated in dotted lines in Figure 1, when the cover 12 is in raised position. A similar handle 24 is secured to the side of the lower unit 11 and extends in parallel relation to the handle 23.

The ports 7 of the receptacle 6 and the inlet ports 13 and 19 of the lower and upper units respectively serve to effect communication with the interior of the vessel 5 to permit water contained therein to enter the receptacle 6 and food container 9, the respective ports being arranged in a manner to lie subjacent of the water level 25 of the vessel 5.

In use, the upper and lower units of the container being disassembled or separated and the respective bottoms closed, eggs are broken and placed in the units, one egg to each unit. The upper unit is then mounted on the lower unit, the bottom seating within the flared section 17 and said bottom of the upper unit serving as a cover for the lower unit. In this assembled condition the food container is placed within the receptacle 6 which is in turn inserted in the cooking vessel 5 containing heated water. Upon insertion, the water in the vessel 5 through the medium of the ports 7, 13 and 19 contacts the eggs contained in the respective units and subjects the same to the cooking operation. When the eggs have been properly cooked or poached the container 9 is removed and the upper unit separated from the bottom unit and the bottoms of each of the units are in turn unlatched to permit the eggs supported thereon to slide or be discharged onto a plate or slice of toast as desired. This final operation permits the eggs to be placed on the slice of toast without the necessity of lifting the same from the bottom and thereby prevents damage or breakage to the yokes or whites.

While I have shown and illustrated my invention as used in connection with the cooking or poaching of eggs, it is to be distinctly understood that the same may be used for cooking other foods.

What I claim is:

1. A device of the character described, comprising, a receptacle having inlet ports and adapted for insertion within a cooking vessel, a food container having upper and lower units formed with inlet ports and adapted to be detachably mounted in said receptacle, said units having completely closed solid hinged bottoms and said upper unit having a hinged top, the bottom of said upper unit forming a top for said lower unit whereby to separate food contained in said container.

2. A device of the character described, comprising, a receptacle having inlet ports and adapted for insertion within a cooking vessel, a food container having upper and lower units formed with inlet ports and adapted to be detachably mounted in said receptacle, said units having completely closed solid hinged bottoms and said upper unit having a hinged top, the bottom of said upper unit forming a top for said lower unit whereby to separate food contained in said container, said bottoms adapted to be removed to an unlatched position to effect removal of food from the respective units when said container is in disassembled condition.

FRANK BACCARINI.